(12) United States Patent
Maerz et al.

(10) Patent No.: US 8,055,568 B2
(45) Date of Patent: Nov. 8, 2011

(54) ENTERTAINMENT CONCEPT EVALUATION; DECISION MATRIX METHOD

(76) Inventors: Robert Maerz, Stone Harbor, NJ (US); Ernest Sjo, Elmwood Park, IL (US)

( * ) Notice: Subject to any disclaimer, the term of this patent is extended or adjusted under 35 U.S.C. 154(b) by 832 days.

(21) Appl. No.: 12/214,423

(22) Filed: May 29, 2008

(65) Prior Publication Data

US 2009/0024451 A1    Jan. 22, 2009

Related U.S. Application Data

(63) Continuation-in-part of application No. 09/813,808, filed on Mar. 22, 2001.

(60) Provisional application No. 60/224,351, filed on Aug. 11, 2000.

(51) Int. Cl.
*G06Q 40/00* (2006.01)
(52) U.S. Cl. .................................................. 705/36 R
(58) Field of Classification Search ............... 705/35–40
See application file for complete search history.

(56) References Cited

U.S. PATENT DOCUMENTS 6,505,174 B1 *  1/2003  Keiser et al. ................. 705/36 R

* cited by examiner

*Primary Examiner* — Olabode Akintola

(57) ABSTRACT

A Entertainment Concept Evaluation is achieved through the use of a Decision Matrix Method. The decision process is a critical tool for aggregating entertainment content on the Internet as well as the monetization of chosen concepts.

1 Claim, 1 Drawing Sheet

Decision Matrix Application and Sequence

[1] Public License includes and defines copyright proliferation and usage;
Public License further includes and defines copyright owner reserved advertising rights;
Public License further includes and defines copyright owner tiered royalty for larger volume content views and/or clip play.

[2] Efficiency Trigger occurs when Expert Resources and/or recommendations reach a verification threshold and/or a positive ESV threshold.

ENTERTAINMENT CONCEPT EVALUATION; DECISION MATRIX METHOD

CROSS REFERENCE TO RELATED APPLICATIONS

The present application is a continuation-in-part and claims the benefit, under 35 U.S.C. .sctn. 120, of U.S. patent application Ser. No. 09/813,808, filed 22 Mar. 2001, and claims the benefit, under 35 U.S.C. .sctn. 119, of U.S. Provisional Patent Application Ser. No. 60/224,351, filed 11 Aug. 2000, which are expressly incorporated fully herein by reference.

FIELD OF INVENTION

The Entertainment Concept Evaluation/Decision Matrix method primarily embodies assigned criteria and variable weight distribution components within the specifics of entertainment concept evaluation. A variable weight ratio is applied to public and expert survey results. A secondary or finer weight is applied independently to specific criteria which can include analytical statistics and attributable informational data. The field of entertainment concepts or content include but are not limited to: TV or Movie Pilots, Film, Trailers, Treatments, Scripts, Storyboards, Animations, Video Games, Books, Audio Books, Short Stories, Flash or PowerPoint Presentations, Photoshop or Illustrator media, Animated Presentations, Songs, Artists, Writers, Plays, Sketches, Casting, Internet Video, Disc Media Video, Music Tracks or Compositions, Music or Vocal Auditions, Talent Auditions, Spoken Word or Poetry, Commercial Product Concepts or Auditions.

BACKGROUND OF THE INVENTION

The Internet breaks down old entertainment business practices and traditions every day. The Entertainment Concept Evaluation/Decision Matrix method combines proven entertainment business practice with the aggregation of critical new concepts through the use of the Internet and the application of an analytical approach.

SUMMARY OF THE INVENTION

The Entertainment Concept Evaluation/Decision Matrix method uses separate custom designed surveys and analytical methods applied to the survey results as a primary data source for an Automated Comparison Matrix (herein ACM). An efficiency component is built into the ACM software enabling the user to accomplish fundamental volume access and control. The ACM also uses a historical data input value from Entertainment Industry data sources, Publishing data sources, Internet archives and databases for comparison. Further research for a historical data input can also include attributes such as Internet interest or popularity; video clip views, keyword and search click thru statistics. Additionally the ACM uses research of copyright, trademark, domain name rights and any form of licensing rights as a possible input value. These steps result in a unique method for the application of a variable ratio of criteria weight at the individual data structure level allowing a secondary or finer weight to be applied with precision at the data structure criterion and baseline level. This application of weight distribution produces a tangible method of evaluating entertainment concepts prior to the concept achieving a true notoriety threshold or a viable sustained commercial product status.

DETAILED DESCRIPTION

Efficiency Software Component and Expert Activity:

Exercising the practice of keeping the Public Survey results separate from the expert survey results allows the use of a variable ratio between the two data structures. The built in variable ratio becomes a function of the process allowing independent and secondary weight assignment to be applied with accuracy to each separate data structure usable by the Automated Comparison Matrix. Other data structures include a Domain Name-Trade Mark-Licensing search value and a Baseline Value. The Automated Comparison Matrix process is designed for expert optimization and survey efficiency. Applicants anticipate a possible imbalance of volume concept submission to the number of available experts. The useful feature of initially using expert opinion as 50%; and then allowing the public to re-sample and have greater input into the evaluation process; without immediate further need for expert opinion; is a means of efficiently allowing experts; through a custom designed user interface; to manage a large volume or substantial amount of survey evaluations with greater accuracy. Applicants anticipate certain concepts having a greater concentration of expert availability to complete surveys as the popularity of a given concept rises, receives advertising sponsorship or receives a high search statistic on the Internet. More than one expert can review or evaluate a single concept, category or group of concepts. Concept re-sampling and valuing is further increased when multiple experts complete evaluations of the same concept. Multiple experts evaluating the same concept is unrelated to performing efficiency aggregation; said multiple experts evaluating the same concept is expected or allowed to be applied to a small top rated percentage of concept evaluations. Experts can achieve ratings or qualifications through the ACM expert user interface. The ACM software program contains and calculates an Expert Performance Factor (herein EPF). The EPF includes total evaluation volume and efficiency rating of aggregated concepts. The EPF also includes super visional hierarchy from intern or understudy to associate expert and further to full category expert. The highest level of expert anticipated by applicants is advertising market maker or specialist. Sponsors may develop a preference of experts through a private user interface included as a separate ACM software component.

Automated Comparison Matrix:

The Automated Comparison Matrix (herein ACM) process begins with a completed input of detailed concept information. The ACM creates a new unique identifier for the concept in the database. The Public Survey Value (herein PSV), the Expert Survey Value (herein ESV), the Survey Special Questions Value (herein SSQV) are assigned to data tables. When the survey algorithm completes the initial task of assigning a ratio to the PSV and ESV, the ACM enters the combined value into an option set. This option set includes values from the; Survey Algorithm, Search Algorithm, Comparison Algorithm, Domain Name-Trade Mark and Licensing search value (herein D/TM/L) and the Baseline Value. The ACM database includes the use of a wild for category descriptions, titles, CSS, URL address and hyperlinks. Different scales or valuating methods can be applied by the ACM process. The following example is given using a ten scale and teaches the ACM process: The ACM calls and runs the survey algorithm. The survey algorithm chooses a ratio from the data table for application to the PSV and ESV based on the SSQV. The PSV and ESV have a maximum total value of 9.5 with a maximum value of 4.75 each. The SSQV possible values are 0 to 3; zero or 1 are a 50/50 ratio. The survey algorithm has a default application of a 50/50 ratio until one of two things occurs: (a) SSQV equals 2 or 3, or (b) the concept has been re-sampled and the SSQV equals 2 or 3. If the SSQV equals 2 or 3 then the survey algorithm applies 100% of the available PSV and ESV with a program tag that a ESV need not be present for future sampling unless the Concept Popular Vote (For) (herein PVF) is equal to or less than the Against (herein PVA) vote; as long as the PVF remains greater than the PVA; a completed ESV is no longer needed for re-sampling. A higher PSV is achieved in a re-sampling by adding the new difference to the previous or original sample total. A lower PSV is achieved by subtracting the difference. The PVF does not add or subtract from the PSV; substantial movement in the PVF within given category parameters can trigger a re-sample request. In the following example; (a) and (b) is the same concept.

Example concept (a): PSV is 3, ESV is 2, SSQV is 3; {3+2=5} since SSQV was 3 on the first survey sample an ESV is not needed on the next sample. A primary value of 5 is entered into the ACM option set by the survey algorithm.

Example concept re-sampling (b): a re-sample is triggered by a substantial upswing in PVF. The survey algorithm runs, and the ACM checks the PSV. The PSV is now 4; the PSV difference between (a) and (b) is 1. The ACM adds this number to the previous value of 5 and the primary ACM survey value is now 6.

In the following example; (c) and (d) is the same concept.

Example concept (c): PSV is 2, ESV is 0, SSQV is 0, {2+0=2} since SSQV was 0 or 1 the survey algorithm adds a request in a data list for an ESV.

Example concept re-sampling (d): PSV is 2, ESV is 1, SSQV is 1; {2+1=3} since SSQV was 1 the PSV cannot increase by way of re-sampling; this concept will need a substantial upswing in PVF to trigger a re-sample request. In a further scenario the PVF does not increase substantially over time and the concept is modified and re-submitted; a new ACM process is started and the SSQV is 2. The concept PSV can now re-sample and increase or decrease without an ESV. Applicants anticipate website display of exact percentages to the top percentages of concept evaluations that have sufficient expert input. The following examples show the application of targeted or variable weight in the Baseline and D/TM/L algorithm: This example uses a 5% Baseline and D/TM/L; a 95% possible total is left for the PSV and ESV. The PSV of a given concept is 4.2 out of a possible 4.75 or 88.42 percent. The ESV is 3.9 out of a possible 4.75 or 82.1 percent. The SSQV is 3. (The public can re-sample opinion without an ESV) The ACM option set has a data input from the comparison algorithm for a D/TM/L value of 0.2 out of a possible value of 0.25 or 80%. The baseline value is 0.15 out of a possible value of 0.25 or 60% {4.2+3.9+0.2+0.15=8.45} or an ACM value of 84.5%. In a further scenario the ESV is consistently higher than the PSV and the SSQV is 3; since the SSQV is at its highest value the expert can enter an assignment of the ESV to the PSV and the ACM can use the 8.1 PSV as its survey total. The expert can also use discretion (within strict parameters) relative to all available information and assign the ESV value to the PSV. If re-sampling has occurred after the assignment, the Public accounted for 81%. Expert input is reduced from the original default of 50%. The said assignment of weight to the PSV (public) is a useful efficiency component of the method. The method of allowing or creating a competitive weight between the public and expert is also a useful marketing model and strategy. Secondary or finer criteria weight in the Baseline and D/TM/L is adjustable. Specific concepts or concept categories can derive greater value benefits when a greater weight is applied to the Baseline and D/TM/L combined value. An example of this would be: a value of 10 being 100% value; the use of a maximum value of 9 for the PSV and ESV combined; leaving a larger or greater weight of 10% for the Baseline and D/TM/L.

Survey Special Questions Value:

As an Entertainment Concept is premiered or showcased on the website; popular vote statistics are recorded in the database. Increased votes for a concept (PVF); and willingness to complete a survey by the public over a period of time triggers a re-sampling of the survey. The period of elapsed time for re-sampling of a concept can be as short as a few days or as long as a year, depending on the speed at which public and expert surveys can be completed. Re-sampling is a full evaluation program event and if SSQV values change; the ratio applied to the surveys changes accordingly. The ACM uses a SSQV of more than one third as a marker to alert experts through the expert user interface; of available sampling assignment to the public. The SSQV includes determination factors; these factors include but are not limited to category dependant market and financial analysis. If no ESV is available, the concept can still be showcased by including the Initial PSV. The SSQV also includes the use of dependent chain questions; where the next question is dependent on the last answer.

Domain Name, Trade Mark, and Licensing Search Values:

Domain, Trademark and Licensing search values. (Herein D/TM/L)

The D/TM/L value is expressed in decimal fractions or percentage and is a separate function. The D/TM/L has a value from 0.1 to 0.5 and is determined by category dependant criteria and weight. Each section of the D/TM/L has different weights given for the different categories. As example: the Comparison Algorithm can return zero for Trade Mark rights of a given book title concept and return a value of 0.2 for Domain Name rights or ownership. The Comparison Algorithm can return 0.1 for License rights. The ACM will then combine the decimals for a total of 0.3 as a value.

ACM Baseline Comparison:

The Baseline value is expressed in decimals or percentage and is a separate function. The Comparison Algorithm can enter 0.1 to 0.5 of Baseline value in the ACM database. Baseline Value is determined by category and criteria dependant search results of Entertainment Industry data sources, Publishing Industry data sources and Internet data sources. Specific attributes and activity are also aggregated if they fall within category criteria parameters. The amount of weight or baseline value used by the ACM is variable or adjustable. Custom designed Baseline profiles are created for concept or concept categories from industry data and or ACM historical data. Applicants further include volume ACM baseline profiling and or use of ACM historical data in relation to volume concept submission increases the accuracy of said profiling process.

ACM Baseline Value Example:

Example: a music, book or Internet audition concept evaluation may not receive positive survey results. The survey algorithm can return zero. In the same instance Internet statistics may return a growing popularity value based on number of video views, audio file plays, comments or keyword clicks. The collection of a sustained interest value from Internet sources over a defined period of time can then be reported by the comparison algorithm as a positive historical value. The ACM can then use the historical data as a baseline value from 0.1 to 0.5 where the previous value was zero.

Determination Factors:

Survey questions and analysis thereof include determination factors. Such determination factors associated with said survey include: Judgment, Degree, Strength, Gradation, Extent, Sensitivity, Acuity, Perception or Insight. Further branched determination factors associated with said survey include financial analysis or forecast; market condition, market recommendation or placement.

True Notoriety or Commercial Product Status:

The Entertainment Concept Evaluation/Decision Matrix process is useful as a business decision component or as part of a solution model where the concept sequence starts at conception; includes copyright verification; and through website promotion evolves into an entertainment product with possible equity participation or advertising value. The Entertainment Concept Evaluation/Decision Matrix process starts at; but is not limited to; a concept which exists prior to achieving a true notoriety threshold or a viable sustained commercial product status.

Negative Values:

Unforeseen negative survey values or negative concept attributes may be used and reported by the ACM as a separate component value. This negative value is not subtracted from the positive integer scale unless it is deemed by a consensus of public and experts to be unavoidable. Public example of attributable negative concept opinion can be found in online posted text and social network user content.

Entertainment Concept Evaluation/Decision Matrix as a Decision Component:

ACM results are useful as an advanced informational decision component. The Decision Matrix process plays an important role in decision making of a concept investment or monetization. ACM results are also useful as an advanced decision component for website advertising revenue.

Entertainment Concept Evaluation/Decision Matrix as a Commercial Investment:

Applicants business model and this application by reference is one of an initial entertainment finance facilitator, packager; producer or agent. The methods or processes contained herein have by design all of the available features of a newly formed investment product. Applicants anticipate many forms of sponsorship and investment in said concepts but do not claim the present application is an internet securities exchange engine; applicants reserve the right to create physical as well as virtual assets. Said virtual assets include: contracts or agreements; licensable rights; traded advertising rights; or advanced agreement concept/product/promotion advertising rights. Further said virtual assets include the use of outside ad serving platforms for sponsors. Additional said virtual assets include the use of outside Internet currency as a physical or virtual asset; or as a method of conversion of virtual currency into physical currency. Applicants anticipate and intend to aid or participate in the facilitation of the funding of selected Decision Matrix tested media concepts. Said funding utilizes proprietary funds, closed-end and open-end funds, private equity or hedge funds, individual or institutional investors; said funding includes the form of options, warrants, equity, debt, hybrid securities, public or private offerings.

Internet Web Page Percentage Component Display:

Applicants Internet server or Internet service is a means for the step of displaying percentages on a web page. Said web site and server software coding generates the percentage component display on the page. The variable percentage page or page component coding related to the Internet display of it; is also a useful tool in other unrelated industries as a form of gauging or analyzing group; employee or social network behavior. An example of related industry fields are: internet content review, polling, voting, internet or television contests. The page displays the constant update of both public and expert percentages applied to a general content concept or an entertainment concept. The percentages are displayed in a table; area; widget or box; are a number, audio representation or visual representation, i.e. graph or picture. The display of said percentages is server generated by the ACM and one example of the web page display language is PHP and or Javascript with a MYSQL database. Other coding and or scripting languages and or database languages are included. The display is a useful marketing strategy based on a form of competitiveness or competitive spirit. One form of the display related to the public's desire to compete with a source of authority, i.e. judge or expert, is detailed herein: the public is given the web page display parameter of a percentage that they start from; this original starting percentage can be shown on a continuous basis to give the public a contrasting figure. The public is allowed and encouraged to compete with the expert or judges opinion in that they can increase their percentage over the experts in a dueling percentages fashion. Blogs and online social chat pages will attempt to elevate the public opinion and decrease the value of the expert or professional opinion. The term "So called Expert" is a good example of attempting to devalue a judge or expert opinion. "The judges' account for 50% of the score and the public accounts for 50% of the score" is a good example of a starting point percentages component display on the web page. The public gains the knowledge of the continuously updated dueling percentage values from the Internet browser web page. The public can increase or decrease their score relative to the judges. This popularity valuing is a means for increasing attention to that entertainment concept or group of concepts. Said increased attention will result in volume page hits or hyperlink click thru. If the public achieves a high percentage or score they will have overcome the "Experts". Dueling percentages includes an Authoritative Source value and or public popularity poll and or vote. Dueling percentages further includes single display of a percentage located in separate columns and or web pages. Said percentage display includes projection and or approximation and or a value displayed through symbolism.

Applicants as Lexicographer:

Applicants claim all rights as lexicographer applied to this application and invention. Entertainment business models, methods, or practices have many relationship possibilities; given the range of method; means; process or system interpretations; applicants submit nomenclature; words as possible alternative and or inclusive meanings; defined as:

Entertainment includes: general internet content; raw or unedited internet content; all forms of expression or art; of interest or notice to a human; chance crossing; educational or serious.

Expert includes: source of authority; professional; experienced; concept or category proficient; single or plurality; judge; understudy; software method, system, feature and or component; process; hierarchical structure and or association; associate advisor; intern applicant and or nominee. Evaluation includes: public opinion; expert opinion; combination of opinion; plurality; software algorithm; algorithm process, method, value or results. Optimization includes: efficiency of experts work product, time or resources; software efficiency program or component; efficient category method; efficient aggregation method; efficient relay of information method; efficient hierarchical method. Survey includes: any opinion recorded via software; vocal; audible; manual; or visual representation; voting; weight; notable; questionnaire;

decision process; any scripting language user input method or form. Software includes: custom user interface; interne or intranet; web server; web pages or components; usage of internet or intranet services; programming; coding or any computerized language and or platform and or browser scripting.

Weight includes: criterion; specificity; opinion; importance; emphasis; influence; decision; amount and or value; entirety; significance; authority; behavior; contrast and or contrasting displays.

Matrix includes: linear equations; option set; map; plurality; singular; comparison; contrast; rows or columns with or without each other; process; computerized network; software and or said software includes. Applicants dictionary is occurring in real time; the present; includes occurring as the future occurs; or will be modified by amendment to meet the changing industry demand; known or unknown form of licensing or agreement; virtual; physical; distribution method; future network variables; specification or process.

Figure 1:
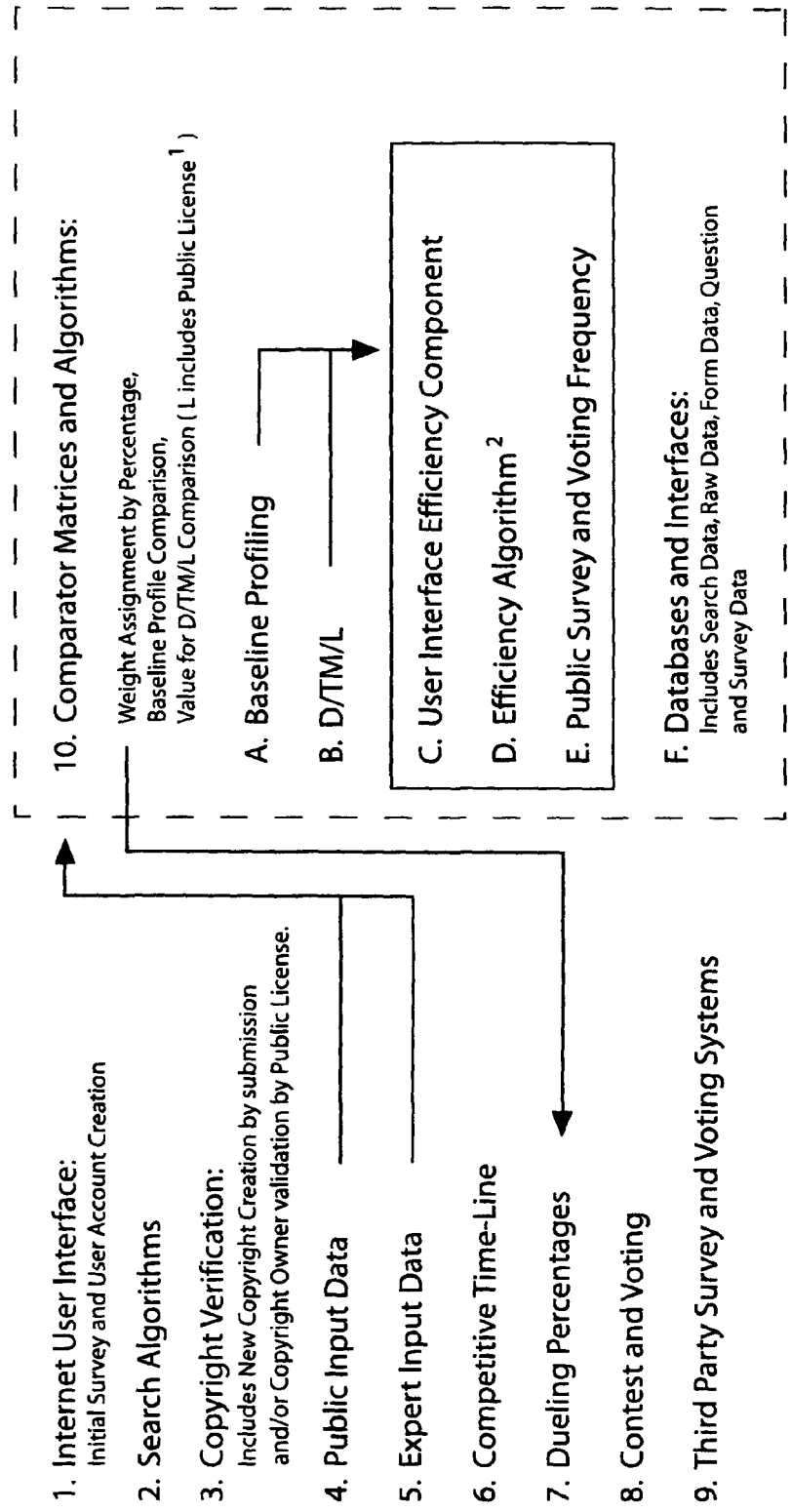
FIG. 1 teaches the ACM component sequence and or the application functions and or elements. Decision Matrix ACM component summary related to FIG. 1 is as follows.

An authoritative source is assigned a value, a public source is assigned a value. Said values are added to an assigned internet domain value, a trademark value, a licensing value. Said combined values include a baseline value. Said combined values are subject to an efficiency trigger prior to authoritative source concept recommendation and or showcase promotion and or advertising sponsorship. Said authoritative source value and or public source value includes the display of singular and or competitive and or dueling percentages.

END STATEMENT

This application is not intended to limit the invention to the precise form disclosed. Many modifications or variations are possible in light of the above teaching. It is intended that the invention be interpreted broadly.

What is claimed is:

1. A method for evaluating an entertainment concept comprising:
   receiving data of public survey result values from a first client browser, wherein said public survey result values are based on internet content and entertainment concept;
   receiving data of expert survey result values from a second client browser, wherein said expert survey result values are based on internet content and entertainment concept;
   applying a ration value to said public survey values and said expert survey values using a survey algorithm;
   conducting an internet search using a search algorithm, wherein said search algorithm records search results in a database;
   comparing the search results to generate comparison results, wherein said comparison results include an entertainment concept evaluation, internet content evaluation and internet media evaluation;
   assigning values to the comparison results using a comparison algorithm, wherein said comparison algorithm includes values from said survey algorithm, search algorithm, and storing said assigned values in a database;
   aggregating these assigned values to generate a final value expressed as a percentage or integer scale;
   displaying said survey results on a web page; and
   attaching advertisement to said entertainment concept evaluation, internet content evaluation and internet media evaluation.

* * * * *